United States Patent Office 3,189,643
Patented June 15, 1965

3,189,643
ALKYL ESTERS OF 3,3'-(2,2,4,4-TETRAALKYLCY-CLOBUTANE-1,3-DIOXY)BISPROPIONIC ACID
Edward U. Elam and James C. Martin, Kingsport, Tenn., assignors to Eastman Kodak Company, Rochester, N.Y., a corporation of New Jersey
No Drawing. Original application Sept. 22, 1960, Ser. No. 57,638, now Patent No. 3,099,679, dated July 30, 1963. Divided and this application Oct. 22, 1962, Ser. No. 237,781
2 Claims. (Cl. 260—468)

This invention relates to new chemical compounds. More particularly the invention relates to novel substituted alkyl ether derivatives of tetraalkylcyclobutanediols.

Our invention provides novel nitriles which are cyanoethylether derivatives of 2,2,4,4-tetraalkyl-1,3-cyclobutanediols, said nitriles having the general formulas:

(I)
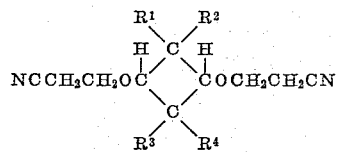

3,3'-(2,2,4,4-tetraalkylcyclobutane-1,3-dioxy) bispropionitrile and (II)
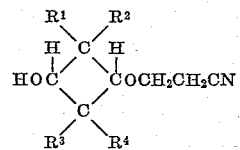

2,2,4,4-tetraalkyl-3-(2-cyanoethoxy)cyclobutanol where $R^1$, $R^2$, $R^3$ and $R^4$ are lower alkyl groups containing from one to four carbon atoms, such as methyl, ethyl, propyl, isopropyl, butyl and isobutyl. $R^1$, $R^2$, $R^3$ and $R^4$ can be identical alkyl groups or any combination of such alkyl groups.

The nitrile compounds of the invention are prepared by reacting acrylonitrile in the presence of a basic catalyst with a 2,2,4,4-tetraalkyl-1,3-cyclobutanediol of the general formula:

(III)
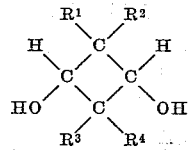

where $R^1$, $R^2$, $R^3$ and $R^4$ are as defined above. This glycol can be prepared by condensing two molecules of dimethyl ketene to obtain the 2,2,4,4-tetramethyl-1,3-cyclobutanedione and then hydrogenating the latter compound, as described in the patent to Hasek et al., U.S. 2,936,324.

Tetraalkylcyclobutanediols of the above structure exist in at least two, and in many cases several, stereoisomeric forms. For the purposes of the present invention no distinction is made between these stereoisomeric forms. Any one of them or a mixture of the stereoisomers of any one glycol can be used for preparing the compounds of the invention. However, different stereoisomeric compounds of the invention will have somewhat different physical properties which will make a particular one or a particular combination of different stereoisomers more desirable than others for particular applications.

The nitriles of our invention are useful as solvents for many organic materials, e.g., for various polymers. They are also useful as plasticizers for various synthetic resins, e.g., poly(vinyl chloride). They are particularly useful as intermediates for preparing different valuable compounds including certain novel compounds of our invention, such as the corresponding amines and carboxylic acids, from which useful polymeric materials can be prepared, as we will describe more fully hereinafter.

The nitriles of the invention are prepared by reacting acrylonitrile with a 2,2,4,4-tetraalkylcyclobutane-1,3-diol. The reaction can be carried out over a considerable temperature range. Temperatures from about 0° C. to 100° C. are suitable, although temperatures somewhat below or above this range can be used. At the lower temperatures the tetraalkylcyclobutanediols react sluggishly; at the higher temperatures the condensation reaction tends to be reversed and polymerization of the acrylonitrile gives tarry materials which are hard to separate from the desired products. In general, reaction temperatures between 50° C. and 90° C. will give the best results. This is the preferred temperature range.

It is usually convenient to carry out the reaction in the presence of a solvent, particularly for those tetraalkylcyclobutanediols which are solids at temperatures below about 50° C. Any solvent which does not react with acrylonitrile or destroy the catalyst under the reaction conditions can be used. Suitable solvents include aliphatic nitriles such as acetonitrile, propionitrile or isobutyronitrile, dimethylformamide, and, at lower temperatures, tert-butyl alcohol.

In general, any basic material will function as a catalyst for the cyanoethylation reaction. Examples of suitable catalysts include sodium, sodium and potassium alkoxides, hydroxides and cyanides; quaternary ammonium hydroxides such as benzyltrimethylammonium hydroxide ("Triton B"); and strongly basic tertiary amines such as triethylenediamine.

The choice of mole ratio of acrylonitrile to diol in the reaction mixture will depend on whether it is desired to obtain the mono- or the di-cyanoethylation product or a mixture thereof. A mole ratio of 1:1 or lower can be used for obtaining the mono-cyanoethylation product. If it is desired to prepare the dinitrile in high purity, the mole ratio should be 2:1 or higher, e.g. 4:1. The order of addition of the reactants is not critical. In general, however, it is preferred to add acrylonitrile to a solution of the catalyst (if used) in the glycol and solvent.

The following examples illustrate preparation of novel dinitriles of the invention.

*Example 1*

A mixture of 526 g. (4 moles) of 2,2,4,4-tetramethyl-1,3-cyclobutanediol, 5 ml. of Triton B, and 450 ml. of acetonitrile was placed in a 3-liter, 3-necked flask fitted with a sealed stirrer, a reflux condenser, and a Y tube which contained a thermocouple well and a dropping funnel. Eight hundred grams (15.1 moles) of acrylonitrile was then added over a period of about 15 minutes. The temperature rose to 75° C. during the addition. The mixture was refluxed for about 1.5 hours after addition was complete, then allowed to stand overnight at room temperature. The crude product was acidified with a little hydrochloric acid, and the excess acrylonitrile was stripped off by distillation to a base temperature of 120° C. at 10 mm. The residue was distilled through a short packed column to give, after removal of 61.7 g. of low-boiler, the following fractions: (1) 165–75° (2.5 mm.), 54.7 g.; (2) 175° (2.5 mm.)–173° (2.0 mm.), M.P. 43–59° C., 179 g.; (3) 173–6° (2.0 mm.), M.P. 47–57° C., 548 g.; and (4) 176–90° C. (2.0–2.5 mm.), 126.3 g. The residue weighed 50 g. The total yield of mixed isomers of 3,3'-(2,2,4,4-tetramethylcyclobutane-1,3-dioxy)bispropionitrile (fractions 1–4) was 90.8%.

*Analysis.*—Calcd. for $C_{14}H_{22}N_2O_2$: C, 67.1; H, 8.80; N, 11.2. Found: fraction 1, N, 10.8; fraction 2, N, 11.3; fraction 3, C, 67.2; H, 8.50; N, 11.1; fraction 4, N, 11.4.

Example 2

The procedure of Example 1 was followed except that the diol and acrylonitrile were mixed in the reaction flask and the catalyst was added dropwise to the stirred mixture. A sudden exothermic reaction, which carried the temperature to 90–95° C., took place. The residue crystallized after neutralization of catalyst and distillation of the excess acrylonitrile and solvent, giving a quantitative yield of crude dinitrile.

Example 3

The procedure of Example 1 was repeated with 2,4-dibutyl-2,4-diethyl-1,3-cyclobutanediol. The yield of 3,3'-(2,4-dibutyl-2,4-diethylcyclobutane-1,3-dioxy)bispropionitrile was 85%.

Example 4

The procedure of Example 1 was followed, except that tert-butyl alcohol was substituted for acetonitrile as the solvent, sodium tert-butoxide was used as the catalyst, and the reaction temperature was held below 40° C. 3,3'-(2,2,4,4-tetramethylcyclobutane-1,3-dioxy)bispropionitrile was obtained in 80% yield.

The following example describes the preparation of 3-(2-cyanoethoxy)-2,2,4,4-tetramethylcyclobutanol by monocyanoethylation of tetramethylcyclobutanediol. Other tetraalkylcyclobutanediols undergo an analogous reaction.

Example 5

A mixture of 288 g. (2 moles) of 2,2,4,4-tetramethyl-1,3-cyclobutanediol, 500 ml. of acetonitrile, and 5 ml. of "Triton B" was placed in a 2-l. flask which was fitted with a sealed stirrer, a reflux condenser, a thermowell, and a dropping funnel. Acrylonitrile (212 g. 4 moles) was then added gradually with stirring. A mild exothermic reaction occurred and the temperature of the mixture rose to 64° C. After the exothermic reaction was over, the mixture was refluxed and stirred for two hours, then acidified with 10 ml. of concentrated hydrochloric acid and distilled. The yield of 3-(2-cyanoethoxy-2,2,4,4-tetramethylcyclobutanol (mixed cis and trans isomers) boiling from 140–152° C. at 4.5 mm. was 120 g. (30%). *Analysis.*—Calcd. for $C_{11}H_{19}NO_2$: C, 67.0; H, 9.64; N, 7.10. Found (144–52°/4.5 mm.) fraction: C, 66.4; H, 9.67; N, 7.47.

We have indicated that the nitriles of our invention are useful as chemical intermediates. Thus, the 3,3'-(2,2,4,4-tetraalkylcyclobutane-1,3-dioxy)bispropionitriles can be hydrolyzed to the corresponding bispropionic acids. The acids are also novel compounds of our invention. They are useful in the same applications as other dibasic acids, i.e., for preparing polyesters, polyamides, etc. The following example describes preparation of a typical dibasic acid of our invention:

Example 6

One hundred seventy-four grams of 3,3'-(2,2,4,4-tetramethylcyclobutane-1,3-dioxy)bispropionitrile was added slowly, with stirring, to 370 g. of concentrated hydrochloric acid which had been preheated to 50° C. The temperature rose during the addition to 95° C., then fell slowly to 50° C., where it was maintained for approximately 39 hours. The reaction mixture was then cooled, diluted with water, and extracted thoroughly with ether. The ether extract was washed with 20% sodium hydroxide until the washings were basic. The aqueous alkaline solution, after washing with fresh ether, was filtered from a small amount of suspended solid, acidified with concentrated hydrochloric acid, and extracted thoroughly with ether. The ether extracts were washed with water, dried over "Drierite," filtered, and evaporated to dryness. The residual 3,3'-(2,2,4,4-tetramethylcyclobutane-1,3-dioxy) bispropionic acid (mixed cis- and trans-isomers) weighed 142 g. and melted in the range 65–89° C. *Analysis.*—Calcd. for $C_{14}H_{24}O_6$: neut. equiv., 144. Found: neut. equiv., 149.

Esterification of the dibasic acid of Example 6 is illustrated in the following example:

Example 7

3,3'-(2,2,4,4-tetramethylcyclobutane-1,3-dioxy) bispropionic acid was esterified with isobutyl alcohol in the usual manner, by refluxing it with an excess of isobutyl alcohol in the presence of a little p-toluene sulfonic acid. The resulting diisobutyl ester of 3,3'-(2,2,4,4-tetramethylcyclobutane-1,3-dioxy)bispropionic acid was a clear, slightly viscous liquid which showed excellent compatibility with celluose, acetate, cellulose acetate-butyrate, and poly(vinyl chloride) resins. The cellulosic and poly(vinyl chloride) resins plasticized with this ester showed excellent clarity, low color, and good low temperature properties. This ester may also be made by saturating an isobutyl alcohol solution of 3,3'-(2,2,4,4-tetramethylcyclobutane-1,3-dioxy)bispropionitrile with anhydrous hydrogen chloride, refluxing several hours, filtering, washing, and distilling.

Example 7 illustrates preparation of the novel dissobutyl alcohol ester of our acid of Example 6 and indicates the advantages of the ester as a plasticizer for cellulosics and poly(vinyl chloride). Esters prepared from alkyl alcohols having two to eight, and preferably four to six, carbon atoms are generally the best plasticizers. In comparison with certain other cycloalkyl dihydroxy alcohol esters, the various esters of our invention will be superior in one or more of the following properties: good compatibility with cellulose esters and poly(vinyl chloride), the resulting compositions having good low-temperature impact strength; good resistance to oxidation, resulting in improved color in the molded products plasticized with our ester; somewhat better temperature-viscosity characteristics and improved stability to oxidation in synthetic lubricants. The improved resistance to oxidation is especially noticeable in the derivatives of the higher tetraalkylcyclobutanediols, such as those of 2,2,4,4-tetraethyl-1,3-cyclobutanediol.

Another important class of derivatives of our novel nitriles comprises the diamines and aminoalcohols which are prepared by hydrogenating the nitriles. Thus, the novel compositions of our invention include 3,3'-(2,2,4,4-tetraalkylcyclobutane-1,3-dioxy)bispropylamines and 2,2,4,4-tetraalkyl-3-(2-cyanoethoxy)cyclobutanols which can be prepared by hydrogenation of the nitriles of Formulas I and II above. The reaction is represented by the following equations:

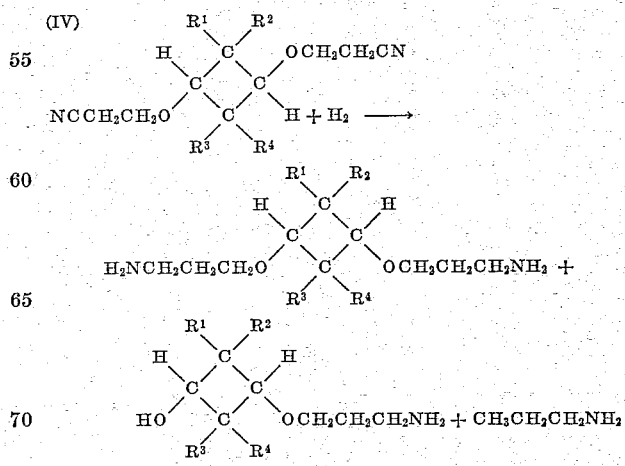

where $R^1$, $R^2$, $R^3$ and $R^4$ are lower alkyl groups containing from one to four carbon atoms, such as methyl, ethyl, propyl, isobutyl, and n-butyl.

Hydrogenation of the 3,3'-(2,2,4,4-tetraalkylcyclobutane-1,3-dioxy)bispropionitriles can be carried out over a wide range of temperatures and pressures. However, it is preferable to operate at as low a temperature as possible in order to avoid hydrogenolysis of the ether linkage, giving propylamine and tetramethylcyclobutanediol or the aminoalcohol (in the event that the latter compound is not desired). The preferred temperature range for the hydrogenation is between 50° C. and 150° C., although lower and higher temperatures from 0° C. or lower to 200° C. or higher will give some of the desired products. The partial pressure of hydrogen in the reaction mixture is also not critical, and will depend primarily upon the amount and type of hydrogenation catalyst employed. In general, pressures between 50 and 5,000 p.s.i. can be used. The preferred pressure range, for rapid reaction without excessive equipment costs, is between 1,000 and 3,000 p.s.i.

Any of the common hydrogenation catalysts, such as Raney cobalt, nickel, or iron; noble metals such as platinum, palladium, rhodium, or ruthenium; or their oxides or easily reducible salts can be used in the process of the invention. The active catalyst can be supported on an inert carrier such as kieselguhr, carbon, alumina, calcium carbonate, barium sulfate, or the like, either in powder or pellet form, if desired.

It is usually advantageous, but not essential, to carry out the hydrogenation in the presence of ammonia, in order to inhibit the fomation of secondary amines and polymers. The use of a solvent is also advantageous. For this purpose, any solvent which is inert under the hydrogenation conditions, and which does not react with the reduction products can be used. Methyl and ethyl alcohol are examples of suitable solvents.

The following examples describe the preparation of our novel amines:

Example 8

A mixture of 380 g. (1.52 moles) of 3,3'-(2,2,4,4-tetramethylcyclobutane-1,3-dioxy)bispropionitrile, 400 ml. of methanol, and 25 g. of alcohol-washed Raney nickel was placed in a 1780-ml. stainless steel autoclave. The autoclave was sealed and 300 ml. of anhydrous ammonia was added from a blowcase. Hydrogen was then added to raise the pressure to 1500 p.s.i., the autoclave was heated to 125° C., and the hydrogenation was completed at 2500 p.s.i. total pressure (6 hrs.). The product was filtered and distilled through a 1-in. x 8-in packed column to give, after removal of solvent and some low-boilers, fractions boiling from (1) 140–145° C. (5–4 mm.), $n_D^{20}$ 1.4701, 44.3 g.; (2) 145° C. (4–4.5 mm.), $n_D^{20}$ 1.4680, 113.6 g., and (3) 145–53° C. (4.5–5 mm.), $n_D^{20}$ 1.4662, 137.4 g. Higher boiling material weighed 49.1 g. The yield of crude 3,3'-(2,2,4,4-tetramethylcyclobutane-1,3-dioxy)bispropylamine (Fractions 2 and 3) was 251.0 g. (64%). Analysis.—Calcd. for $C_{14}H_{30}N_2O_2$: neut. equiv., 129. Found: fraction 1, 215; fraction 2, 144; fraction 3, 131.

Fractions 1, 2, and 3 above were combined and carefully refractionated to give fractions boiling from (1) 109.5–17.0° C. (1.6 mm.), 28 ml.; (2) 116–123° C. (2.0–1.8 mm.), 25 ml. (solidified on cooling); (3) 123–36° (1.8 mm.), 40 ml., and (4) 136–151° (1.8–5.0 mm.), $n^{20}_D$ 1.4660, 160 ml. Analysis.—Calcd. for $C_{11}H_{23}NO_2$ (aminoalcohol): neut. equiv. 201; calcd. for $C_{14}H_{30}N_2O_2$ (diamine): neut. equiv. 129. Found: fraction 1, 207; fraction 2, 199; fraction 4, 129.

The above analysis shows that fractions 1 and 2 obtained by careful refractionation in Example 8 were essentially pure 3-(2-cyanoethoxy)-2,2,4,4 - tetramethylcyclobutanol, and Fraction 4 was pure 3,3'-(2,2,4,4-tetramethylcyclobutane-1,4-dioxy)bispropylamine.

Example 9

Three hundred grams of 3,3'-(2,2,4,4-tetramethylcyclobutane-1,3-dioxy)bispropionitrile in 400 ml. of methanol was hydrogenated over 25 g. of alcohol-washed Raney nickel and in the presence of 300 ml. of anhydrous ammonia at 75° C. and 2,000–2,500 p.s.i. pressure. The reaction required approximately 10 hours. The product was filtered and distilled to give, after removal of solvent, 40 g. of forerun boiling from 135–149° C. (5 mm.) and 236 g. (76.1% yield) of 3,3'-(2,2,4,4-tetramethylcyclobutane-1,3-dioxy)bispropylamine, boiling from 149–151° C. (5 mm.), $n_D^{20}$ 1.4662. The residue weighed 15 g.

Example 10

3,3'-(2,4-dibutyl-2,4-diethylcyclobutane-1,3-dioxy) bispropionitrile was hydrogenated as described in Example 8 to give 3,3'-(2,4-dibutyl-2,4-diethylcyclobutane - 1,3-dioxy)bispropylamine in 50% yield.

The 3,3'-(2,2,4,4-tetraalkylcyclobutane-1,3 - dioxy)bispropylamines are particularly useful as intermediates for the preparation of high molecular weight polyamides. The following example demonstrates the utility of our novel amines for preparing valuable polyamides.

Example 11

A salt was prepared by reacting equimolar amounts of 3,3'-(2,2,4,4-tetramethylcyclobutane-1,3-dioxy)bispropylamine and terephthalic acid. A low molecular weight prepolymer was prepared by heating this salt for several hours in p-cresol solution. The p-cresol was then removed, and the polymerization completed in vacuo at a final temperature of 280° C. The resulting polyamide had an inherent viscosity of 0.4 and a melting range of 178–82° C. This polymer formed a flexible, transparent film.

Although the invention has been described in considerable detail with reference to certain preferred embodiments thereof, it will be understood that certain modifications can be effected without departing from the scope of the invention as described hereinabove and as defined in the appended claims.

This application is a division of our application Serial No. 57,638, filed September 22, 1960, now U.S. Patent No. 3,099,679. Also divisions of the parent application are Serial No. 237,780 and Serial No. 237,782, both filed October 22, 1962.

We claim:

1. An ester of an alkanol having from two to eight carbon atoms per molecule with a 3,3'-(2,2,4,4-tetraalkylcyclobutane-1,3-dioxy)bispropionic acid of which the alkyl groups contain one to four carbon atoms.

2. Diisobutyl ester of 3,3'-(2,2,4,4-tetramethylcyclobutane-1,3-dioxy)bispropionic acid.

References Cited by the Examiner

Mousseron et al.: "Chem. Abstracts," vol. 42, page 1901c (1948).

Stinson et al.: "J. Org. Chem.," vol. 19 (1954), page 1047.

LORRAINE A. WEINBERGER,
*Acting Primary Examiner.*

LEON ZITVER, *Examiner.*